(12) United States Patent
Boucadair et al.

(10) Patent No.: US 11,088,942 B2
(45) Date of Patent: Aug. 10, 2021

(54) METHOD OF QUIC COMMUNICATION VIA MULTIPLE PATHS

(71) Applicant: ORANGE, Issy-les-Moulineaux (FR)

(72) Inventors: Mohamed Boucadair, Chatillon (FR); Christian Jacquenet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/626,731

(22) PCT Filed: Jun. 26, 2018

(86) PCT No.: PCT/FR2018/051561
§ 371 (c)(1),
(2) Date: Dec. 26, 2019

(87) PCT Pub. No.: WO2019/002754
PCT Pub. Date: Jan. 3, 2019

(65) Prior Publication Data
US 2020/0120015 A1    Apr. 16, 2020

(30) Foreign Application Priority Data

Jun. 27, 2017 (FR) ...................................... 1755872

(51) Int. Cl.
*H04L 12/707* (2013.01)
*H04L 12/28* (2006.01)
(Continued)

(52) U.S. Cl.
CPC .......... *H04L 45/24* (2013.01); *H04L 12/2898* (2013.01); *H04L 12/66* (2013.01);
(Continued)

(58) Field of Classification Search
None
See application file for complete search history.

(56) References Cited

U.S. PATENT DOCUMENTS 6,003,088 A * 12/1999 Houston ................. H04L 29/06
709/230
6,018,770 A    1/2000 Little et al.
(Continued)

FOREIGN PATENT DOCUMENTS

CN    101895458 A    11/2010

OTHER PUBLICATIONS

International Search Report dated Sep. 18, 2018 for corresponding International Application No. PCT/FR2018/051561, filed Jun. 26, 2018.

(Continued)

*Primary Examiner* — Lashonda T Jacobs
(74) *Attorney, Agent, or Firm* — David D. Brush; Westman, Champlin & Koehler, P.A.

(57) ABSTRACT

A method of communication, in which a communicating device is situated behind a residential gateway able to implement the QUIC (Quick UDP Internet Connection) protocol and connected to a plurality of paths Pi, where i=1, . . . , N, on which the gateway can dispatch data packets received from the communicating device, and receive packets of data intended for the communicating device. The method includes: the gateway associating a respective connection identifier C_ID #i with each of the paths Pi; and, when the gateway receives a data packet from the communicating device, the gateway transmits this data packet on one of the paths Pi while taking into account the connection identifier C_ID #i corresponding to this path Pi.

13 Claims, 4 Drawing Sheets

(51) Int. Cl.
*H04L 12/66* (2006.01)
*H04L 12/803* (2013.01)
*H04L 29/06* (2006.01)
*H04L 29/08* (2006.01)

(52) U.S. Cl.
CPC ............ *H04L 47/125* (2013.01); *H04L 67/14* (2013.01); *H04L 69/164* (2013.01)

(56) References Cited

U.S. PATENT DOCUMENTS

| | | | | |
|---|---|---|---|---|
| 8,730,870 | B2* | 5/2014 | Walter | H04W 4/04 370/328 |
| 10,097,465 | B2* | 10/2018 | Sreeramoju | H04L 47/2475 |
| 10,129,372 | B2* | 11/2018 | Ravi | H04L 45/24 |
| 10,200,277 | B2* | 2/2019 | Sreeramoju | H04L 45/24 |
| 10,742,541 | B2* | 8/2020 | Kim | H04L 69/04 |
| 2001/0034791 | A1* | 10/2001 | Clubb | H04L 67/025 709/238 |
| 2003/0026243 | A1* | 2/2003 | Oran | H04L 65/607 370/352 |
| 2008/0212484 | A1* | 9/2008 | Kaminsky | H04L 41/12 370/248 |
| 2009/0052466 | A1* | 2/2009 | Khalid | H04L 45/122 370/467 |
| 2011/0103298 | A1* | 5/2011 | Walter | H04W 4/04 370/328 |
| 2011/0103392 | A1* | 5/2011 | Fan | H04L 41/0654 370/401 |
| 2011/0216646 | A1* | 9/2011 | Flinta | H04L 12/66 370/220 |
| 2013/0039343 | A1* | 2/2013 | Hori | H04W 36/12 370/331 |
| 2013/0124757 | A1* | 5/2013 | Norrman | H04L 63/06 709/242 |
| 2013/0194963 | A1* | 8/2013 | Hampel | H04L 45/24 370/254 |
| 2014/0169330 | A1* | 6/2014 | Rommer | H04W 36/08 370/331 |
| 2015/0381455 | A1* | 12/2015 | Martinsen | H04L 45/22 370/252 |
| 2016/0119196 | A1* | 4/2016 | Comeras | H04L 69/14 709/226 |
| 2016/0373342 | A1* | 12/2016 | Kolan | H04L 45/24 |
| 2017/0163774 | A1* | 6/2017 | Boucadair | H04L 67/34 |
| 2018/0027433 | A1* | 1/2018 | Elliott | H04W 24/04 370/216 |
| 2018/0103123 | A1* | 4/2018 | Skog | H04L 69/14 |
| 2019/0208040 | A1* | 7/2019 | Boucadair | H04L 69/24 |
| 2019/0268797 | A1* | 8/2019 | Pang | H04L 47/28 |
| 2019/0273809 | A1* | 9/2019 | Boucadair | H04L 69/18 |
| 2020/0120015 | A1* | 4/2020 | Boucadair | H04L 12/66 |
| 2020/0145324 | A1* | 5/2020 | Wei | H04L 61/2007 |
| 2020/0336411 | A1* | 10/2020 | Batardi Re | H04L 69/22 |

OTHER PUBLICATIONS

Written Opinion of the International Searching Authority dated Sep. 18, 2018 for corresponding International Application No. PCT/FR2018/051561, filed Jun. 26, 2018.
English translation of the Written Opinion of the International Searching Authority dated Sep. 28, 2018 for corresponding International Application No. PCT/FR2018/051561, filed Jun. 26, 2018.
International Preliminary Report on Patentability dated Dec. 31, 2019, for corresponding International Application No. PCT/FR2018/051561, filed Jun. 26, 2018.
P. Pillay-Esnault, Ed. et al., "Problem Statement for Mapping Systems in Identity Enabled Networks draft-padma-ideas-problem-statement-00" Internet Society (ISOC) 4, Rue Des Falaises Ch 1205 Geneva, Switzerland, Sep. 15, 2016 (Sep. 15, 2016) pp. 1-25 XP015115275.
R. Hamilton et al., Entitled "QUIC: A UDP-Based Secure and Reliable Transport for HTTP/2" (IETF draft-tsvwg-quic-protocol-02, Jan. 2016).

* cited by examiner

METHOD OF QUIC COMMUNICATION VIA MULTIPLE PATHS

CROSS-REFERENCE TO RELATED APPLICATIONS

This application is a Section 371 National Stage Application of International Application No. PCT/FR2018/051561, filed Jun. 26, 2018, the content of which is incorporated herein by reference in its entirety, and published as WO 2019002754 on Jan. 3, 2019, not in English.

FIELD OF THE DISCLOSURE

The present invention relates to the field of telecommunications, and in particular the communication networks capable of implementing the IP (Internet Protocol) protocol. More particularly, the present invention relates to the provision of services in the IP networks "with added value", that is to say the networks capable of performing differentiated processes depending on the nature of the traffic routed in the network.

The invention applies to any type of user equipment, such as a fixed or mobile terminal, or a "connected TV", or a TV decoder (or "set-top-box", or STB), or even a media server, said user equipment being situated behind a residential gateway (that is to say a domestic gateway or one situated in an enterprise). As a corollary, the invention applies when a first residential gateway is situated behind a second residential gateway; in this case, the first residential gateway will be considered as a user equipment. For conciseness, a user equipment of any type will often be called "terminal" hereinbelow.

BACKGROUND OF THE DISCLOSURE

The terminals, such as smartphones and personal computers (or PCs) are now capable of activating and exploiting multiple logical interfaces linked to one or more physical interfaces. Such terminals are called "multi-interface" (or MIF). When a terminal has several interfaces capable of connecting it to different access networks (for example: fixed, mobile or WLAN), it then benefits from an access that is called "hybrid", because it combines different access network technologies.

Several IP addresses can then be assigned to an MIF terminal. These addresses are used when it connects to different types of networks such as a fixed network, a mobile network or a WLAN ("Wireless Local Area Network", of which Wi-Fi networks are an emblematic example), simultaneously or with delay. These IP addresses can:
- belong to the same family of addresses or to distinct families of addresses (IPv4, IPv6 or both),
- have different lifetimes,
- have different ranges, for example private IPv4 address, unique IPv6 address of local range (Unique Local Address, or ULA), or IPv6 address of global range (Global Unicast Address, or GUA), and
- be assigned to the same logical network interface or to different logical network interfaces.

It will however be noted that the "MIF" feature is volatile, because the capacity to use several interfaces depends on the conditions of connection to the network(s), on the location of the device, or on other factors. A device can become MIF during the setting up of a simple communication (that is to say, a communication set up along a single path with a given correspondent), or even after the setting up of a simple communication. It will also be noted that a device does not a priori know whether it is possible to use several distinct paths to set up a communication with a given correspondent; more specifically, the device acquires this information (if necessary) only after a phase during which it tries to set up a communication using multiple paths with the correspondent.

It is recalled that a "multiple path communication" is a communication set up between two devices simultaneously using one or more paths between these two devices. The setting up and the maintaining activity of such a communication rely on the use of a dedicated protocol, such as MPTCP (Multi-Path TCP), which can possibly be defined as an extension of a transport protocol defined previously, such as TCP (initials for "Transmission Control Protocol"). In other words, a multiple-path communication is an aggregate of one or more simple communications using one and the same path or different paths (partially or completely unconnected).

It is also recalled that, in the networks field, "link aggregation" designates the grouping together of several links associated with as many (logical) interfaces as if it were a single link associated with a single interface, notably in order to increase the bit rate beyond the limits of a single link, but also to apply the same operating procedures to all of the duly aggregated links (concept of "fate sharing"). In particular, the offerings of services concerning a terminal having hybrid access rely on the introduction into the network of functions making it possible to aggregate all of the network communications of a terminal (for example: WLAN and 3G, or ADSL, WLAN and 4G).

Link aggregation also makes it possible to ensure that other interfaces take over if a network link drops out (principle of redundancy). The link aggregation applies to any type of traffic routed along these links, including IP traffic.

Link aggregation can also be used to distribute traffic over multiple links. In this case, the distribution of traffic between the links which are the subject of an aggregate depends on various parameters; the distribution of traffic can thus depend on the traffic engineering policy (for example prioritize the routing of a particular traffic over a link whose characteristics in terms of robustness or availability are compatible with the nature of said traffic), or on the policy of quality of service (or QoS) which can for example prioritize certain links in a traffic prioritization context.

It will be noted that link aggregation makes no assumption as to the configuration of the remote machine. Thus, a source machine can invoke a link aggregation function without the remote machine using such a function.

Various aggregation modes can be envisaged, including the following three modes:
- backup mode: this mode consists in using secondary paths in case of unavailability of the primary paths, and do so, in order to enhance the network availability and, thereby, the robustness and the reliability of the IP communications set up over the different links;
- bonding mode: this mode consists in using the resources associated with all or part of the available paths, the IP streams associated with one and the same application being able to be distributed between multiple paths; the choice of exploiting all of the paths, or only a part thereof, can for example be conditioned by the nature of the traffic or the characteristics of availability or of reliability associated with each path, which can vary strongly from one path to another; all the paths selected for this bonding mode are considered to be primary paths; and so-called "comfort" mode: this mode is similar to the bonding mode, except that the streams of a given application are not distributed between multiple paths, but are sent over a single path.

It will be noted that these modes are not mutually exclusive, and are not specific to a particular type of traffic. Thus, they can be put in place independently of the nature of the traffic which will be routed along the aggregated paths according to one or other of the different modes.

The transport protocols mostly used by the software applications to communicate over the internet are TCP (mentioned above) and UDP (initials for "User Datagram Protocol").

However, several transport protocols have been proposed, standardized and implemented by the internet community to satisfy the new application requirements. For example, some new applications require more transport functions compared to those offered by TCP and UDP, whereas others consider that the transport functions offered by TCP or UDP are not (all) necessary for their needs.

The transport functions are defined as being the list of services offered by a protocol used to multiplex connections at the transport layer level. This list contains, for example, ordered transmission of the data, reliable transmission, congestion control or integrity control. A working group, called "Transport Services" (TAPS), was created by the IETF (Internet Engineering Task Force) to assist the developers in defining the interfaces that make it possible to invoke the different services offered by the transport protocols specified by the IETF.

Thus, the SCTP (Stream Control Transmission Protocol) was specified to satisfy the needs of the applications which require more transport functions than is possible with TCP, such as preservation of the structure of the data as generated by the application, or multiple-path communications. The DCCP (Datagram Congestion Control Protocol) protocol is another transport protocol which was specified for applications which require more transport functions than is possible with UDP, such as congestion control, without necessarily inheriting constraints from a connection-oriented protocol like TCP (for example, the constraint of ensuring reliable transmission). The UDP-lite protocol is a simplified version of the UDP protocol which was proposed for applications which do not require all the functions offered by UDP (for example, integrity control). The DTLS (Datagram Transport Layer Security) and TLS protocols were defined to satisfy the encryption needs of the applications at the transport layer level.

Despite these efforts to specify and implement other transport protocols, the deployment of TCP remains hegemonic. The main reasons which penalize the introduction of new transport protocols on a large scale faced with the TCP hegemony are:

the proliferation of the NAT (Network Address Translation), firewall and TCP acceleration functions, and the lack of compatibility with the operating systems embedded in the terminals.

Also, different approaches can be considered for the introduction of new transport functions facilitating the routing of certain traffic in the internet:

encapsulation over TCP or UDP; this approach consists in transporting the primitives of a new transport protocol over an existing protocol, dispensing with the constraints imposed by the NAT/firewall crossing;

definition of new TCP extensions; the objective of these TCP extensions is to satisfy new application constraints (for example, to increase the resiliency in case of a change of IP address), but also to compose IP networks with new conditions (for example, increasing the bit rate of the TCP connections), and new requirements of the users (for example, to enhance security or reduce the waiting delay before the session is set up).

In doing so, the core mission of the service providers and IP network operators is to provide a level of usage quality comparable with applications relying on TCP and those relying on UDP. It is therefore desirable to have a functional parity that is as wide as possible between TCP and UDP. In particular, it would be useful to be able to set up UDP communications via multiple paths in a way that is functionally comparable with the known technical solutions, such as the MPTCP protocol mentioned above, which allow the setting up of TCP connections via multiple paths.

Thus, the QUIC (Quick UDP Internet Connection) protocol, described in the article by R. Hamilton et al., entitled "*QUIC: A UDP-Based Secure and Reliable Transport for HTTP/2*" (IETF draft-tsvwg-quic-protocol-02, January 2016), is a protocol currently being standardized at the IETF which relies on UDP, and whose ambition is to reduce the latency times generally observed when setting up HTTP connections. The QUIC protocol was initially proposed by the company Google, which has incorporated it in its "Chrome" web browser.

As illustrated in FIG. 1, which schematically represents a QUIC connection between a client C and a server S, a QUIC connection makes it possible to multiplex different channels, called "streams", in one and the same connection. The QUIC protocol makes it possible to relieve the operating system of the constraints imposed by the transport layer, such as the cyclic redundancy checking intended to verify the integrity of the communication.

In the QUIC protocol, most of the packet headers are encrypted in order to enhance the security and the robustness of the communication. Unlike the TLS (initials for "Transport Layer Security") protocol, QUIC does not encrypt only the payload data exchanged, but also the connection control information. The QUIC information sent in plain language is limited to strictly the minimum (for example, the version number or a connection identifier).

The use of UDP makes it possible to accommodate the presence of intermediate devices (or "middle boxes"), such as firewalls or NAT, on the path used by a QUIC communication. The ambition of the QUIC protocol is to limit the connection setup procedure (handshake) to zero RTT (Round-Trip Time), which means that the payload data can be sent immediately, that is to say as soon as the first packet of a QUIC connection is sent, without the QUIC client having to wait for the response from its correspondent. A specific "stream" is dedicated to the encryption of the connection set up exchanges (handshake) and to the negotiation of the QUIC options. The QUIC signaling incorporates information making it possible to control congestion and recover lost packets, according to a mode of operation comparable to that of TCP.

In flow control terms, a QUIC client has the capacity to send frames called "WINDOW_UPDATE" which make it possible to adjust the "offset" limit for a given "stream", which makes it possible to improve the efficiency of the transmission of the packets, like the window size control function characteristic of the TCP protocol ("offset" is a parameter which allows a QUIC receiver to gauge the size of the data reception window; as the data are received on a given "stream", the receiver sends frames WINDOW_UPDATE which make it possible to increase the offset value in order to allow the transmitter to send even more data over this "stream"). Furthermore, QUIC comprises a connection control mode which makes it possible to manage the size of the buffer memories (or "buffers") allocated by a QUIC client to all of the characteristic "streams" of a connection.

In order to be able to accept any change of IP address without having to close a current QUIC connection, the protocol does not rely on the transport addresses (source IP address, source port number, destination IP address, destination port number), but on an identifier called CID (Connection IDentifier). This identifier is generated randomly by a QUIC client.

That being so, the QUIC protocol in its current definition presents certain drawbacks, notably:
- QUIC does not make it possible to discover the list of the IP addresses used by a remote terminal;
- QUIC does not make it possible to distinguish the migration of a connection to a new path, or the simultaneous use of a set of known paths;
- a terminal using QUIC does not have the possibility of dynamically discovering multiple paths when this terminal is situated in a residential or enterprise local access network (LAN);
- a terminal using QUIC which would have discovered by any means the availability of multiple paths does not have the possibility of forcing the packets transmitted by this terminal to follow one of these paths which would be chosen by the terminal;
- even if the QUIC connection identifier is unique, a remote server cannot send data to a client by using any path as long as the client has not used this path previously to communicate with the server;
- QUIC does not allow a termination point to indicate to a correspondent the traffic distribution policies with which it is compatible or that it wants to activate; in the absence of such policies, an abusive use of certain paths could for example have impacts on the quality of experience of the correspondent in case of violation of a ceiling linked to the maximum load of a link (quota), as permitted by the service offering;
- the traffic distribution policies via multiple paths as activated by a QUIC terminal may not be optimal for the operator; for example, the typical distribution policy in a hybrid access environment (that is to say an environment allowing a terminal to exploit to resources of several wired and wireless access networks) is to use the radio resources only if the main link (fixed access, usually) is saturated; now, a terminal using QUIC does not know these policies; furthermore, in the context of a hybrid access, the delegation of management of the traffic distribution policy to the terminals can lead to the saturation of certain radio cells while the fixed network can be used for the traffic flow;
- a terminal attached to an access network is incapable of using the resources associated with this network if only IPv6 prefixes are allocated to set up communications over this network even though the remote server with which a QUIC communication is set up is accessible only with the use of IPv4 addresses; indeed, the IPv4 and IPv6 protocols are incompatible by design, and it is therefore impossible to set up a QUIC communication between a terminal which would have only an IPv6 address and a server which is accessible only at an IPv4 address.

SUMMARY

The present invention therefore relates to a communication method, in which a communicating device is situated behind a residential gateway capable of implementing the QUIC (Quick UDP Internet Connection) protocol and connected to a plurality of paths Pi, in which i=1, ..., N, over which said gateway can send data packets received from said communicating device, and receive data packets intended for said communicating device, said method comprising the following steps:

a) said gateway associates a respective connection identifier C_ID #i with each of said paths Pi, and b) when the gateway receives a data packet from the communicating device, the gateway transmits this data packet over one of the paths Pi by taking account of the connection identifier C_ID #i associated with this path Pi.

By virtue of these provisions, a QUIC communication will be able to benefit from the resources associated with multiple paths, even if these multiple paths are not visible from the end points of the communication. More specifically, the setting up of a QUIC communication over multiple paths will benefit from enhanced robustness and performance, which will make it possible to improve the use of the resources in the network, but also improve the quality of experience as perceived by the client (notably by virtue of the capacity to aggregate the bandwidth likely to be used by the QUIC communication, or the capacity to switch traffic to another path in case of failure for example).

Moreover, the network operators will be able to better control certain functions (notably the management of the multiple-path communications for a deterministic traffic distribution) which will allow them to optimize the use of the network resources available to them, and therefore to propose added value QUIC connectivity services.

According to particular features, said method comprises, beforehand, the following steps:
- said communicating device discovers said plurality of paths Pi, and
- the communicating device sends to said gateway one or more messages specifying a respective connection identifier C_ID #i for each of said respective paths Pi.

Thus, when the gateway receives a data packet from the communicating device comprising a connection identifier C_ID #i, the gateway transmits this data packet over the path Pi associated with this connection identifier C_ID #i.

By virtue of these provisions, a QUIC client can force the selection of a specific path to route certain packets, if necessary despite the path selection decision executed by a node situated farther away in the network and capable of setting up a QUIC communication over multiple paths; a QUIC client can thus influence the traffic distribution policy between multiple paths, even if the traffic distribution decision is executed by a node situated farther away in the network.

It will be noted that this procedure does not require any modification of the network elements situated between the client and the node capable of using multiple paths to set up a QUIC communication.

According to even more particular features, said gateway sends to said communicating device a message containing the list of the paths Pi known to the gateway.

By virtue of these provisions, a QUIC client can dynamically discover the existence of multiple paths (not visible locally).

It will be noted that the use of one and the same QUIC connection identifier allows for traceability of the QUIC connections when attaching the QUIC client to new networks.

That is why, according to other particular features, when said gateway receives from said communicating device a data packet comprising a connection identifier C_ID #0, the gateway transmits this data packet over one of said paths Pi, by replacing said connection identifier C_ID #0 with said connection identifier C_ID #i associated with that path Pi if the connection identifiers C_ID #0 and C_ID #i are different from one another.

By virtue of these provisions, the confidentiality of the QUIC communication is improved, and the risks of data hacking based on the knowledge of the connection identifier are minimized. Furthermore, the traceability of a QUIC client who changes access network is rendered more difficult.

According to even more particular features, when said data packet received from said communicating device is transmitted in response to a message transmitted by its correspondent, said gateway transmits this data packet to the correspondent over the path over which said message arrived at the gateway.

By virtue of these provisions, the gateway knows in this case the path over which it must transmit said data packet received from the communicating device.

According to yet other particular features, said communicating device and/or said gateway send to the correspondent of the communicating device a message comprising the list of the paths known to the communicating device and/or to the gateway.

By virtue of these provisions, said correspondent is informed of the paths that he or she can use to send data to the communicating device. That is notably useful for communicating to the correspondent addresses to be used to send data to the communicating device without the latter having used one of these addresses previously to communicate with that correspondent.

According to yet other particular features, said gateway implements a traffic distribution policy comprising traffic distribution rules between the different networks available.

By virtue of these provisions, the quality of client experience is improved without the QUIC clients adopting an aggressive behavior with respect to the access network(s), that is to say a behavior which would have the consequence of using up all of the resources of the access network solely to the benefit of the QUIC communications and to the detriment of the other applications likely to employ these same resources.

According to yet more particular features, said gateway sends to the communicating device a message describing the traffic distribution policy to be observed.

By virtue of these provisions, a QUIC client can dynamically discover the traffic distribution policies executed by a node situated farther away in the network, observe these policies, and optionally inform its correspondent thereof.

Correlatively, the invention relates to various devices.

Thus, it relates, firstly, to a communicating device situated behind a residential gateway capable of implementing the QUIC (Quick UDP Internet Connection) protocol and connected to a plurality of paths Pi, in which i=1, . . . , N, over which said gateway can send data packets received from said communicating device, and receive data packets intended for said communicating device, said communicating device comprising means for:

discovering said plurality of paths Pi, and sending to said gateway one or more messages specifying a respective connection identifier C_ID #i for each of said respective paths Pi.

It will be noted that the communicating devices involved in a communication according to the invention can be any devices compatible with the IP protocol. Such a communicating device can be of any type, for example a client device (terminal) or a content server. It can have one or more IP addresses assigned to each of its physical or logical interfaces. It may also have only one interface, in which case the residential gateway, to which the client device is connected, is a relay device connected to one or more networks and compatible with the QUIC protocol.

According to particular features, said communicating device also comprises means for receiving from said gateway, and taking account of, a message containing the list of the paths Pi known to the gateway.

The invention relates also, secondly, to a residential gateway capable of implementing the QUIC (Quick UDP Internet Connection) protocol and connected to a plurality of paths Pi, in which i=1, . . . , N, over which said gateway can send data packets received from a communicating device situated behind said gateway, and receive data packets intended for said communicating device, said gateway comprising means for:

associating a respective connection identifier C_ID #i with each of said paths Pi, and when it receives a data packet from the communicating device, transmitting this data packet over one of the paths Pi by taking account of the connection identifier C_ID #i associated with this path Pi.

According to particular features, said residential gateway also comprises means for:

receiving from said communicating device one or more messages specifying a respective connection identifier C_ID #i for each of said respective paths Pi, and when it receives a data packet from the communicating device comprising a connection identifier C_ID #i, transmitting this data packet over the path Pi associated with this connection identifier C_ID #i.

According to other particular features, said residential gateway also comprises means for:

receiving from said communicating device a data packet comprising a connection identifier C_ID #0, and transmitting this data packet over one of said paths Pi, by replacing said connection identifier C_ID #0 with said connection identifier C_ID #i associated with this path Pi if these connection identifiers C_ID #0 and C_ID #i are different from one another.

The advantages offered by these devices are essentially the same as those offered by the communication methods briefly explained hereinabove.

It will be noted that it is possible to produce these communicating devices in the context of software instructions and/or in the context of electronic circuits.

The invention also targets a computer program that can be downloaded from a communication network and/or stored on a medium that can be read by computer and/or that can be executed by a microprocessor. This computer program is noteworthy in that it comprises instructions for executing the steps of one of the communication methods briefly explained hereinabove, when it is run on a computer.

The advantages offered by this computer program are essentially the same as those offered by the communication methods briefly explained hereinabove.

BRIEF DESCRIPTION OF THE DRAWINGS

Other aspects and advantages of the invention will become apparent on reading the following detailed description of particular embodiments, given as nonlimiting examples. The description refers to the accompanying figures, in which.

DETAILED DESCRIPTION OF ILLUSTRATIVE EMBODIMENTS

A number of embodiments of the invention will now be described.

In these embodiments, a residential gateway is considered which is denoted CPE (initials for "Customer Premises Equipment") connected to one or more networks N1, N2, N3, and so on, by one or more paths P1, P2, P3, and so on. As represented schematically in FIG. 2, the CPE associates a connection identifier C_ID #1 with a path linking it to the network N1, a connection identifier C_ID #2 with a path linking it to the network N2, a connection identifier C_ID #3 with a path linking it to the network N3, and so on. It will be noted that these connection identifiers are not necessarily all different from one another; in some cases, one and the same connection identifier may be used for all the packets sent or transmitted by the CPE over each of the paths in the context of one and the same QUIC communication.

Figure 1:
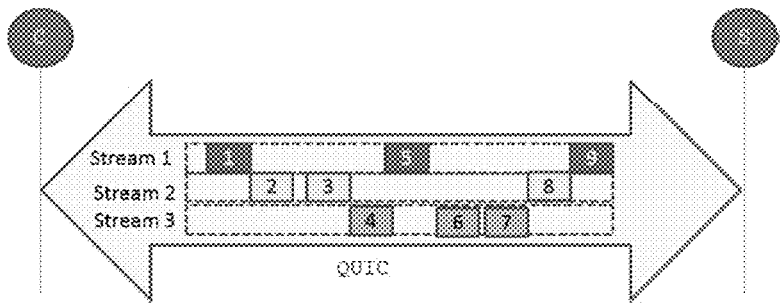
FIG. 1, mentioned above, schematically represents a conventional QUIC connection comprising several "streams" (channels)
Figure 2:
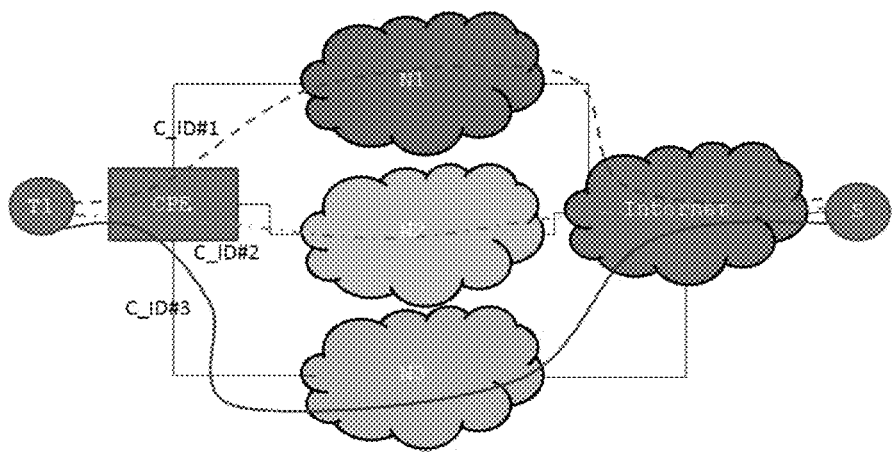
FIG. 2 represents a gateway connected to a plurality of paths and capable of associating a respective connection identifier with each of said paths, FIG. 3 schematically represents a procedure of discovery of multiple paths according to a first embodiment of the invention.

As illustrated in FIG. 2, the CPE can for example serve as intermediary in a QUIC communication between a server S and a terminal T1 (single interface, or multiple interfaces) located behind the CPE.

Figure 3:
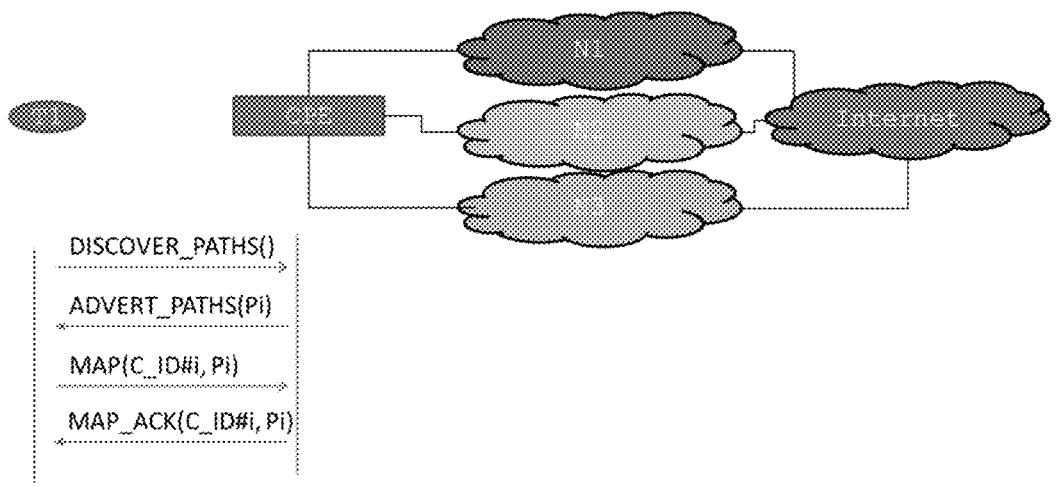

According to a first embodiment, a terminal T1 is considered that is located behind a CPE and capable of implementing a multiple path discovery procedure. This discovery procedure is represented schematically in FIG. 3.

To discover the multiple paths known to the CPE in addition to the paths that are locally visible, the terminal T1 can transmit messages, called DISCOVER_PATH( ); such a message can be sent over all or just some active network interfaces of the terminal.

If multiple paths are known to the CPE, the latter sends a list of the available paths using the primitive ADVERT_PATHS(Pi). A given path Pi can be identified by:

a path index local to the CPE (path identifier), for example, "1", "2", "155467", an interface index local to the CPE (index interface), for example, "Ifindex1", "Ifindex2", "Ifindex15", an interface name, for example "cellular", "adsl", "fiber", an address or an external IP prefix, for example "1.2.3.4" or "2001:db8::/56", a physical address, for example an MAC (Medium Access Control) address, a combination of an index and of an external IP address, or any other identifier, including any combination of the abovementioned information elements.

The message ADVERT_PATHS(Pi) can be sent by a CPE following a solicitation from a terminal situated behind the CPE, or spontaneously, that is to say without the CPE having been explicitly solicited by a terminal. As an example, the CPE can send a message ADVERT_PATHS(Pi):

on the restarting of the CPE, periodically over the local area network(s) to which different terminals are connected, when a new terminal connects to the CPE via the local area network, when the CPE connects to a new access network, when the CPE is disconnected from an access network inopportunely or not, or upon the changing of IP address/prefix allocated by an access network.

When therefore a terminal T1 discovers a plurality of paths Pi, in which i=1, . . . , N, it determines a respective connection identifier C_ID #i for each respective path Pi. The terminal T1 then contacts the CPE to program packet distribution policies over the different available paths. To do this, the terminal T1 sends one or more messages MAP (C_ID #i, Pi). The message MAP( ) also, optionally, makes it possible to announce the characteristics of the traffic (notably, the IP addresses and the source and destination port numbers), in order to be able to identify a QUIC connection likely to route said traffic.

It will be noted that the message MAP( ) can be sent before, or after, the setting up of a QUIC connection with a correspondent of the terminal T1.

Following the reception of one or more message(s) MAP (C_ID #i, Pi), the CPE installs the associations as indicated by the terminal T1. If an association is already present for this terminal and for one and the same connection identifier, the CPE replaces it with a new instruction received from the terminal T1. The CPE uses a stable identifier, such as an MAC address, to identify the associations of one and the same terminal. The associations can have a limited lifetime.

The CPE can complement the characteristic information of an association with information received from the correspondent of the terminal T1.

The CPE can indicate to the terminal T1 another connection identifier to be used in case, for example, of conflict between an identifier C_ID #i and an identifier already chosen by another terminal. Other connection identifier selection policies can be executed by the CPE. The purpose of the allocation of the connection identifier by the CPE (or by a device installed by the operator) is to facilitate the identification of the QUIC connections. Indeed, the CPE anticipates the reception of QUIC packets by installing traffic profiles according to the connection identifier known previously. It will be noted in this respect that this possibility for an entity other than a client or a server of allocating a connection identifier is not known in the state of the art.

Then, the CPE sends to the terminal T1 an acknowledgement message MAP_ACK( ) which provides an inventory of the installed associations. Optionally, the CPE can also return the other associations known for this terminal.

In order to allow the CPE to distribute the traffic via the different multiple paths according to a policy known to the terminal T1, the latter must naturally use the appropriate identifier in accordance with the associations programmed previously on the CPE.

It will be noted that the CPE can distribute the traffic received from a terminal between several paths available without said terminal having in any way communicated to the CPE traffic distribution instructions, nor even the terminal being informed of the existence of multiple paths. To this end, the CPE executes a traffic distribution algorithm according to the preconfigured policies.

Figure 4:
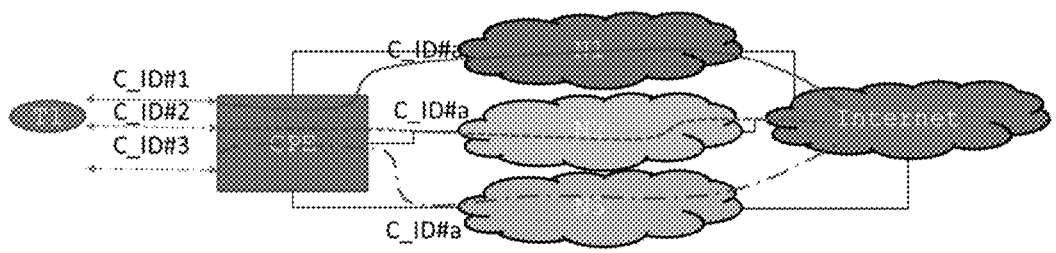
FIG. 4 represents the sending by a terminal of three packets within one and the same QUIC connection according to an example of said first embodiment.

FIG. 4 illustrates, by way of example, the sending by a terminal T1 of three packets within one and the same QUIC connection; each of these packets is identified by a dedicated connection identifier C_ID #i. On reception of these packets by the CPE, the latter consults its associations table to determine the path to be used to send the packet to its destination. In this example, a packet whose connection identifier is C_ID #1 is transmitted via the network N1, a packet whose connection identifier is C_ID #2 is transmitted via the network N2, and a packet whose connection identifier is C_ID #3 is transmitted via the network N3. It will be noted that the packets transmitted are associated with the same connection identifier (denoted C_ID #a in FIG. 4); this identifier can be generated by the CPE, but also, as a variant, by the terminal T1 or by its correspondent.

As mentioned above, the use of one and the same connection identifier C_ID on the various networks crossed allows the traceability of the QUIC connections when attaching to new networks, which threatens the confidentiality of the exchanges. Embodiments of the invention will now be described in which, to resolve this problem, "aliases" of QUIC connection identifiers can be created by one or other of the participants to a QUIC communication.

Figure 5:
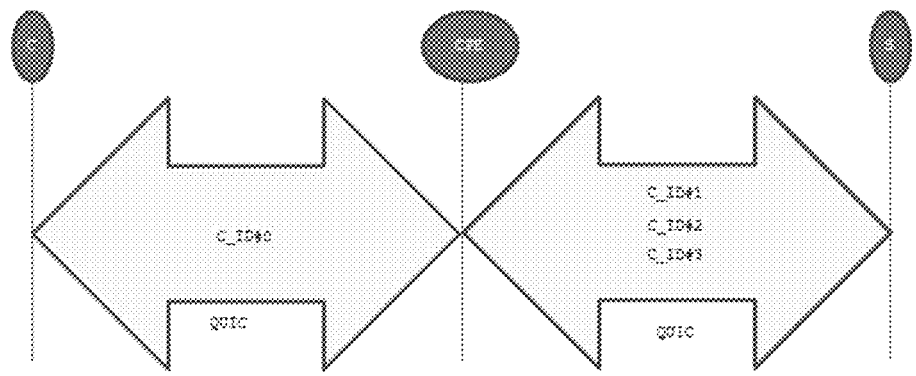
FIG. 5 represents a QUIC communication between a client C and a server S according to a second embodiment of the invention.

Consider, for example, according to a second embodiment of the invention illustrated in FIG. 5, a client C located behind a CPE. This client C transmits data packets comprising a QUIC connection identifier denoted C_ID #0 generated by the client C.

Following the reception of the first data packet characteristic of a new communication between the client C and the server S, the CPE puts in place associations between connection identifiers C_ID #i (aliases) and the respective paths Pi, for example by configuring an associations table in a database.

It will be noted that an alias can be generated by the CPE, but also, as a variant, by the client C or by the server S. For example, if said first packet is received by the CPE from the server S over a path Pi, and this path comprises a connection identifier C_ID #i, the CPE preferably associates this alias C_ID #i with this path Pi.

It will also be noted that various schemes are possible for the values assigned to the aliases with respect to the value of the "original" connection identifier C_ID #0, for example:

C_ID #i identical to C_ID #0 regardless of i=1, . . . , N, or

C_ID #i identical to C_ID #0 for a single value of i, or even

C_ID #i different from C_ID #0 regardless of i=1, . . . , N.

Moreover, any two aliases C_ID #i and C_ID #j, with i different from j, can have values that are the same or different from one another.

The CPE then transmits said first packet to its recipient (server S or client C).

Consequently, for each reception by the CPE of a packet characteristic of this communication from the client C, the CPE transmits this packet to the server S over one of the paths Pi, after consulting its associations table and modifying, in this packet (if necessary), the value of the QUIC connection identifier, that is to say replacing C_ID #0 with the alias C_ID #i associated with the path Pi (if C_ID #i is different from C_ID #0).

The CPE can notably implement this procedure of rewriting the original QUIC connection identifier C_ID #0 in order to contribute to the preservation of the confidentiality of the data exchanged between the client C and the server S. During the communication, the CPE can decide to update the connection identifier if it connects to a new network, or if the data are distributed via multiple paths known to the CPE and/or to the server S. These aliases are then, preferably, known only to the CPE and to the server S.

For a client or a server to be able to inform its correspondent of the migration of the QUIC connection identifier (C_ID), a procedure is proposed for migration of C_ID (for example during an active connection or upon a change of the attachment to the network), in which:

the migration of C_ID can be initiated by the CPE, the client or the server;

the migration of C_ID can take place at any moment during a QUIC connection; thus, the migration of C_ID can take place just before the migration of a connection to a new path (or a new network attachment), or take place just after the migration of a connection to a new path (or a new network attachment); and the same security keys are used to validate the migration of C_ID.

Figure 6:
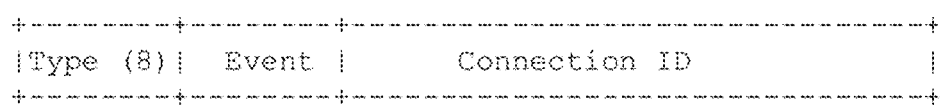
FIG. 6 represents an example of format for a frame CID_UPDATE used for updating the QUIC connection identifier.

To do this, the client or the server sends a frame of type "CID_UPDATE". An example of format for this frame CID_UPDATE is represented in FIG. 6. This frame is sent in a QUIC message whose identifier is that of the QUIC connection already setup between the participants. This frame can be sent jointly with other data, or be sent in a dedicated QUIC message. On reception of the QUIC message which contains a frame CID_UPDATE by a correspondent, the latter proceeds with the conventional QUIC validations to ensure that the message originates from a legitimate terminal. Once the message is validated, the correspondent extracts the information contained in the frame CID_UPDATE.

Figure 7:
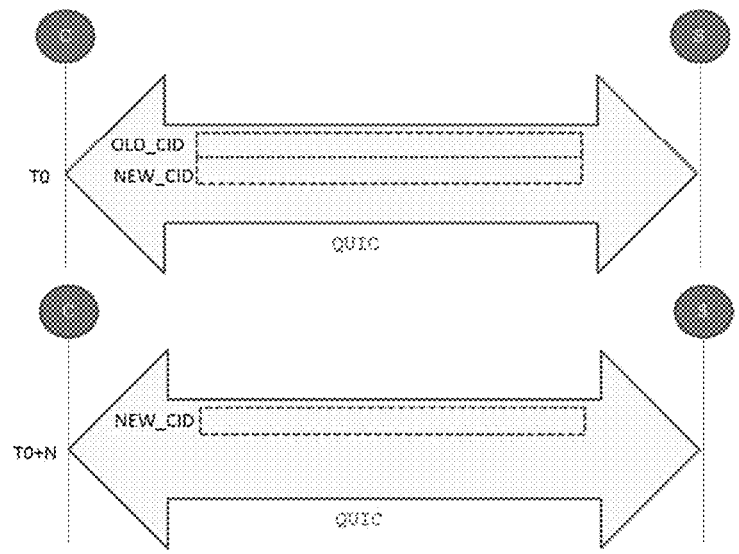
FIG. 7 represents, according to a variant of said updating procedure, the replacement of the identifier of a QUIC connection between a client C and a server S.

If the "event" field is set to "0" (MIGRATE), there is then an immediate updating of the connection identifier, as illustrated in FIG. 7 in which a connection identifier, denoted "OLD_CID" in this figure, is replaced by a new connection identifier, denoted "NEW_CID". Any QUIC exchange under this connection must then use a new identifier.

If the "event" field is set to "1" (ALIAS), an alias of the connection identifier C_ID #0 is then defined for each path. Several aliases can be indicated in one and the same frame.

Whatever the embodiment, the operator may want to apply a traffic distribution policy. It will be assumed here that traffic distribution policies can be configured on the CPE, in order to allow it to distribute the traffic between the different networks available; these policies can be configured by a service provider or by a user; an example of policy consists in using the radio resources only in case of unavailability of a fixed access network or when the available resources (maximums) of the main access network (typically the wired network) no longer allow the traffic characteristic of a given application to be handled; the traffic distribution policies are critical, because an inappropriate use of the available resources can induce a rapid consumption of the quota available on a given access link, even provoke a significant increase in the billed amount to be paid by the user; the control of a traffic distribution policy is also critical for an operator because it makes it possible notably to minimize the risk of congestion of certain links (for example, the excessive use of a cellular connection by a multiple-interface CPE can cause a cell to be congested to the detriment of the single-interface mobile terminals). Advantageously, the CPE can adjust its traffic distribution policies according to the observed network conditions.

The CPE can communicate to the terminal/client the traffic distribution policy to be observed, by means of the primitive MAP(C_ID #i, Pi, POLICY). The POLICY object can comprise, for example:

a maximum volume of data to be sent per path, a traffic distribution ratio (for example, 10% for P1, 80% for P2, 10% for P3), an order of priority for invocation of the resources associated with each path (for example, use P1 first then P2 in case of congestion), a path which will be used only to backup a main path (for example, P2 is designated as backup path for P1), an indication according to which the path exhibiting the best RTT must be used, an indication according to which the paths exhibiting a similar RTT must be used, an indication according to which the "streams" with a high priority must be routed via given path.

The terminal/client must observe the traffic distribution policy as indicated by the CPE. Given that the traffic distribution policy does not concern only the outgoing traffic but also the incoming traffic, a new frame, called MP_POLICY, is used to notify a correspondent of the terminal/client.

A terminal/client capable of exchanging data via multiple paths can include a frame MP_POLICY in a QUIC message sent to its correspondent. This frame makes it possible to announce to the correspondent the list of the paths known to the terminal/client (notably, the addresses to be used to send data to the terminal/client without the latter having used one of these addresses previously to communicate with this correspondent), as well as, optionally, the incoming traffic distribution policy (from the correspondent to the terminal/client).

Figure 8:
FIG. 8 represents an example of format for a frame MP_POLICY used to notify a traffic distribution policy to a correspondent.

A possible format for this frame MP_POLICY is represented in FIG. 8. In this figure:

the "type" field indicates that it is an "MP_POLICY" frame, the "sub-type" field can indicate for example the following values:

"0": list of the multiple paths known to the transmitter; the "data" field must then include a list of paths known to the transmitter of the frame; as an example, the "data" field can include a list of IP addresses (or of ports) to be used to send packets to one and the same terminal under one and the same multiple-path connection;

"1": traffic distribution policy between the different multiple paths; the available paths can be used simultaneously;

"2": a maximum volume of data is to be sent per path; the "data" field specifies the volume and the path concerned;

"3": indicates a usage ratio per path; the "data" field specifies this policy, for example 10% for P1, 80% for P2, and 10% for P3;

"4": indicates that the best RTT algorithm must be used.

The frame MP_POLICY can be sent by one of the participants, or by all the participants to a QUIC connection. It can be sent at any moment of a QUIC connection. It can be sent jointly with other control data or payload data. One or more frames MP_POLICY can be included in one and the same QUIC message. A frame MP_POLICY can be used to signal that a path is no longer available.

A QUIC correspondent receiving a frame MP_POLICY saves a copy of the content of the frame in its QUIC connections table. Typically, this table contains connection identifiers (C_ID). If the frame mentions other IP addresses (or ports), the correspondent can use this information to communicate via multiple paths, that is to say send packets having as destination address (destination port) one of the addresses indicated in the frame MP_POLICY. Thus, the traffic distribution policies indicated in the frame MP_POLICY inform the correspondent of the approach to be followed to send the data of one and the same QUIC connection to the different available paths.

Figure 9:
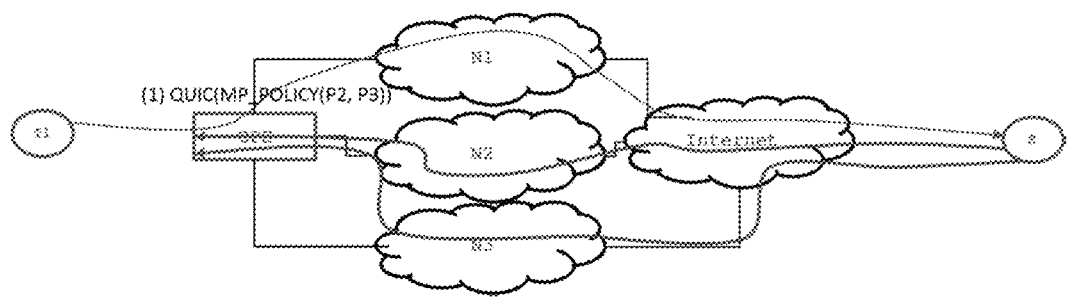
FIG. 9 represents a QUIC communication between a client T1 and a server S, according to a first variant of use of the frame MP_POLICY.

FIG. 9 represents a QUIC communication between a terminal T1 and a server S, according to a first variant in which the terminal T1 announces to the server S the list of the paths available using a frame MP_POLICY. The frame is sent via the path which crosses the network N1. The server can send the data of this same connection via the other paths to the terminal T1 (N2 or N3) without the terminal T1 having used these paths to communicate with S.

Figure 10:
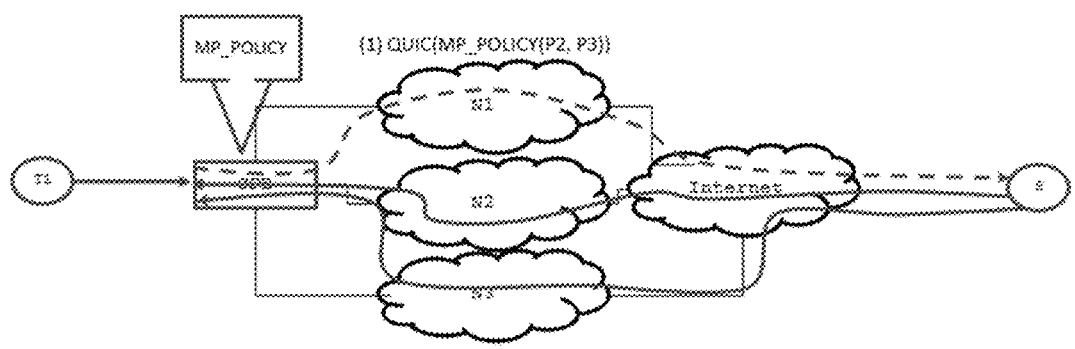
FIG. 10 represents a QUIC communication between a client T1 and a server S, according to a second variant of use of the frame MP_POLICY.

FIG. 10 represents a QUIC communication between a terminal T1 and a server S, according to a second variant in which a frame MP_POLICY is inserted by the CPE.

According to a third variant (not represented), the content of the frame MP_POLICY can be controlled and possibly modified by the CPE. This variant makes it possible to add to the list of the multiple paths and to indicate the traffic distribution policy consistent with that of the operator, notably in the case where the CPE is operated by the operator. Thus, the CPE can remove the connection identifier from the public (that is to say unencrypted) header, if another connection identifier is included in the encrypted part of the QUIC message.

Figure 11:
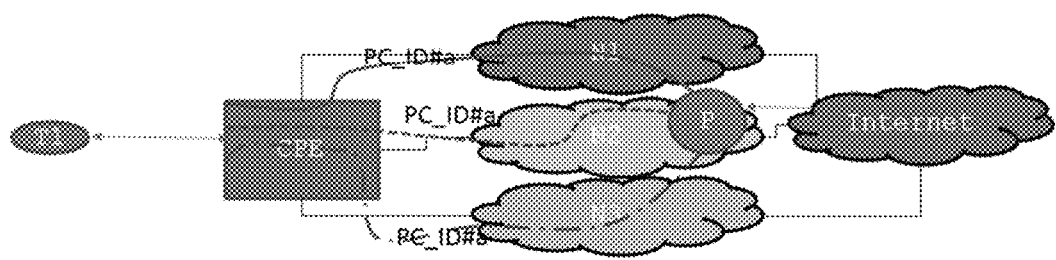
FIG. 11 represents a multiple-path QUIC communication assisted by the network.

Whatever the embodiment, in the case where the QUIC connection identifier used by a terminal is encrypted, a new identifier called "Provider Connection Identifier", and denoted PC_ID, can be used by an operator to control the use of the different access networks accessible from a CPE to set up QUIC connections. Furthermore, as illustrated in FIG. 11, a device called "QUIC Provider Proxy" (denoted P in FIG. 11) is introduced into the network of the operator to control the routing of the data along the different multiple paths, but also to remove said identifier PC_ID before the routing of the data to their final destination.

The "Provider Connection Identifier" information is:

injected by a CPE or by a "QUIC Provider Proxy", removed by the CPE before proceeding with the routing of the packets to the terminal, and removed by the QUIC Provider Proxy device before proceeding with the routing of the packets to the destination S.

The frame MP_POLICY defined above can be used both by the CPE and by the "QUIC Provider Proxy" device to announce the different paths and the traffic distribution policy to be applied both for the uplink and for the downlink, according to the requirements.

FIG. 11 shows how the "QUIC Provider Proxy" device (P) makes it possible to use the resources of the different multiple paths without effecting the QUIC connection identifier chosen by a terminal T1 located behind this CPE. The QUIC packets sent by T1 are intercepted by the CPE, which injects a unique identifier PC_ID #a and a frame MP_POLICY on the various available paths. On reception of these packets by a "QUIC Provider Proxy" device, this device saves the information contained in the frame MP_POLICY in the local connections table, then removes the objects PC_ID #a and MP_POLICY from the packets before sending them to their final destination.

The invention can be implemented within communication network nodes, for example terminals, routers or residential gateways, by means of software and/or hardware components.

The software components will be able to be incorporated in a conventional network node management computer program. That is why, as indicated above, the present invention relates also to a computer system. This computer system conventionally comprises a central processing unit controlling, by signals, a memory, and an input unit and an output unit. Furthermore, this computer system can be used to run a computer program comprising instructions for implementing any one of the communication methods according to the invention.

Indeed, the invention also targets a computer program as described briefly above. This computer program can be stored on a medium that can be read by computer and can be executed by a microprocessor. This program can use any programming language, and take the form of source code, object code, or intermediate code between source code and object code, such as in a partially-compiled form, or in any other desirable form.

The invention also targets an information medium that is non-removable, or partially or totally removable, comprising instructions of a computer program as described briefly above.

This information medium can be any entity or device capable of storing the program. For example, the information medium can comprise a storage means, such as a ROM, for example a CD ROM or a microelectronic circuit ROM, or a magnetic storage means, such as a hard disk, or even a USB key ("USB flash drive").

Also, the information medium can be a transmissible medium such as an electrical or optical signal, which can be routed via an electrical or optical cable, by radio or by other means. The computer program according to the invention can in particular be downloaded over a network of internet type.

As a variant, the information medium can be an integrated circuit in which the program is incorporated, the circuit being adapted to execute or to be used in the execution of any one of the communication methods according to the invention.

Although the present disclosure has been described with reference to one or more examples, workers skilled in the art will recognize that changes may be made in form and detail without departing from the scope of the disclosure and/or the appended claims.

The invention claimed is:

1. A communication method comprising the following acts:
   a) a residential gateway associating a respective connection identifier C_ID #i with each one of a plurality of paths Pi, wherein the residential gateway is capable of implementing the QUIC (Quick UDP Internet Connection) protocol and is connected to the plurality of paths Pi, in which i=1, . . . , N, over which said residential gateway can send data packets received from a communicating device situated behind the residential gateway, and receive data packets intended for the communicating device; and
   b) in response to the residential gateway receiving a data packet from the communicating device, the residential gateway transmitting this data packet over one of the paths Pi by taking account of the connection identifier C_ID #i associated with this path Pi.

2. The communication method as claimed in claim 1, wherein the method comprises, beforehand, the following acts:
   said communicating device discovers said plurality of paths Pi, and
   the communicating device sends to said residential gateway one or more messages specifying a respective connection identifier C_ID #i for each of said respective paths Pi,
   and wherein, in response to the residential gateway receiving a data packet from the communicating device comprising a connection identifier C_ID #i, the residential gateway transmits this data packet over the path Pi associated with this connection identifier C_ID #i.

3. The communication method as claimed in claim 2, wherein said residential gateway sends to said communicating device a message containing list of the paths Pi known to the residential gateway.

4. The communication method as claimed in claim 1, wherein, in response to said residential gateway receiving from said communicating device a data packet comprising a connection identifier C_ID #0, the residential gateway transmits this data packet over one of said paths Pi, by replacing said connection identifier C_ID #0 with said connection identifier C_ID #i associated with this path Pi if these connection identifiers C_ID #0 and C_ID #i are different from one another.

5. The communication method as claimed in claim 4, wherein, in response to said data packet received from said communicating device being transmitted in response to a message transmitted by its correspondent, said residential gateway transmits this data packet to the correspondent on the path on which said message arrived at the residential gateway.

6. The communication method as claimed in claim 1, wherein at least one of said communicating device or said residential gateway sends to the correspondent of the communicating device a message comprising a list of the paths known to the at least one of the communicating device or the residential gateway.

7. The communication method as claimed in claim 1, wherein said residential gateway implements a traffic distribution policy comprising traffic distribution rules between the different available networks.

8. The communication method as claimed in claim 7, wherein said residential gateway sends to the communicating device a message describing the traffic distribution policy to be observed.

9. A communicating device comprising:
a processor; and
a non-transitory computer-readable medium comprising instructions stored thereon which when executed by the processor configure the communicating device to perform acts comprising:
discovering a plurality of paths Pi connected to a residential gateway capable of implementing the QUIC (Quick UDP Internet Connection) protocol, in which i=1, . . . , N, over which said residential gateway can send data packets received from said communicating device, which is situated behind the residential gateway, and receive data packets intended for said communicating device, and
sending to said residential gateway one or mom messages specifying a respective connection identifier C_ID #i for each of said respective paths Pi.

10. The communicating device as claimed in claim 9, wherein the communicating device is further configured to receive from said residential gateway, and take account of, a message containing the paths Pi known to the residential gateway.

11. A residential gateway comprising
a processor; and
a non-transitory computer-readable medium comprising instructions stored thereon which when executed by the processor configure the residential gateway to implement the QUIC (Quick UDP Internet Connection) protocol and to perform acts comprising:
associating a respective connection identifier C_ID #i with each of a plurality of paths Pi connected to the residential gateway, in which i=1, . . . , N, and over which said residential gateway can send data packets received from a communicating device situated behind said residential gateway, and receive data packets intended for said communicating device, and
in response to the residential gateway receiving a data packet from the communicating device, transmitting this data packet over one of the paths Pi by taking account of the connection identifier C_ID #i associated with this path Pi.

12. The residential gateway as claimed in claim 11, wherein the residential gateway is further configured to:
receive from said communicating device one or more messages specifying a respective connection identifier C_ID #i for each said respective paths Pi, and
in response to receiving a data packet from the communicating device comprising a connection identifier C_ID #i, transmit this data packet over the path Pi associated with this connection identifier C_ID #i.

13. The residential gateway as claimed in claim 11, wherein the residential gateway is further configured to:
receive from said communicating device a data packet comprising a connection identifier C_ID #0, and
transmit this data packet over one of said paths Pi, by replacing said connection identifier C_ID #0 by said connection identifier C_ID #i associated with this path Pi if these connection identifiers C_ID #0 and C_ID #i are different from one another.

* * * * *